R. WHEELER.
COURSE INDICATOR.
APPLICATION FILED JULY 9, 1918.
1,316,821.
Patented Sept. 23, 1919.
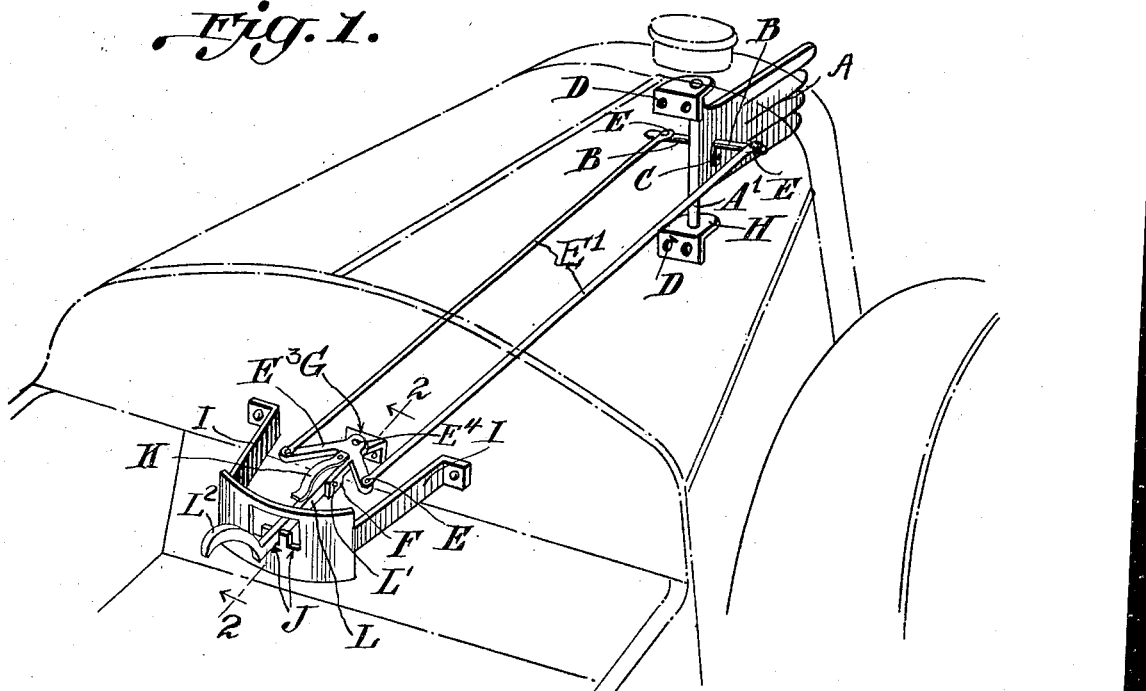
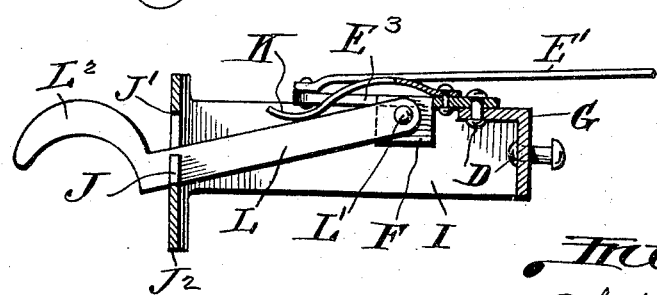

UNITED STATES PATENT OFFICE.

ROBERT WHEELER, OF WELLSBURG, WEST VIRGINIA.

COURSE-INDICATOR.

1,316,821.  Specification of Letters Patent. Patented Sept. 23, 1919.

Application filed July 9, 1918. Serial No. 244,111.

*To all whom it may concern:*

Be it known that I, ROBERT WHEELER, a citizen of the United States, residing at Wellsburg, in the county of Brooke and State of West Virginia, have invented a new and useful Course-Indicator, of which the following is a specification.

My invention relates to a course indicator to be attached to automobiles, auto trucks, auto-ambulances, and all vehicles propelled by steam, gas, oil or electricity, and the objects of my invention are first to provide a means by which the driver of an automobile, auto truck, or auto ambulance can indicate the course to be taken at street corners, cross roads or on crowded thoroughfares. Second to provide a means by which the course to be taken at street corners, cross roads and on crowded thoroughfares by the driver of an automobile, auto truck or auto ambulance can be plainly observed. Third to provide a means by which the course to be taken by an auto ambulance, or auto truck on a battle field can be plainly indicated, and observed. Fourth, to provide a means by which the drivers of automobiles, auto trucks and auto ambulances can guard against collisions at street corners, cross roads and on battle fields. I attain these objects by the mechanism illustrated in the accompanying drawing in which:

Figure 1 is a perspective view illustrating my invention and showing the practical application thereof, Fig. 2 is a detail vertical longitudinal section taken substantially on line 2—2 of Fig. 1.

Referring now to these figures my invention contemplates the provision of a pointer A located in front of the radiator of an automobile, motor car and the like and provided with laterally outstanding side arms B, these arms being secured to the body of the pointer by virtue of their inner downturned extremities C. At the rear end of the body of the pointer A, which latter may be in the form of an indicating hand, as shown in Fig. 1, is an upright stem, the upper and lower extremities of which are journaled in brackets D, the latter of which are secured in any suitable manner to the front of the radiator, as for instance, by means of a vertical supporting strap (not shown) or by bolts extending through the interstices of the radiator to act as clamps.

The arms B of the pointer are pivoted at their extremities at E to the forward ends of rearwardly extending connecting rods E', which connecting rods project through the hood of the automobile preferably above the engine inclosed thereby, and are in turn pivotally connected at their rear ends at $E^2$ to the rear extremities of a pair of rearwardly diverging arms $E^3$ of a lever which is pivoted to swing horizontally upon a bracket G secured by bolts or otherwise to the dash or instrument board of the machine. A lever $E^4$ which carries the arms $E^3$ has a rearwardly extending central arm F and to this arm F the forward end of a controlling lever L is pivoted at L'. The rear end of the controlling lever L has a curved handle $L^2$ extending through an arcuate slot J' in a plate $J^2$ having forwardly projecting side arms I secured to the dash or instrument board at opposite sides of the bracket G, the lower portion of the arcuate opening J communicating with recesses into which the controlling lever L is shiftable to respectively hold the pointer A in the longitudinal and inclined positions which I will now describe.

The controlling lever L is normally held in its lowermost position in one of the recesses of the plate $J^2$ by virtue of a spring K, the free end of which bears upon the said lever and the opposite end of which is anchored on the lever $E^4$.

Thus to shift the parts it is obvious the handle $L^2$ of lever L must be raised moving the lever out of engagement with the recessed portion of the plate $J^2$ so that it may be shifted to the right or left as the case may be, similar movement being of course communicated to the lever $E^4$ and thence through the connecting rods E' to the pointer A, so as to shift the latter to either its right or left inclined positions or its central position. It is obvious that with the pointer mounted and operating as described, with the connections shown, it is possible for the operator of a vehicle to readily shift the pointer for the various purposes mentioned in the objects of the invention first above outlined, and it is furthermore obvious that such movements will be positive and unfailing.

It is furthermore obvious that my invention provides for the above purposes an apparatus which is simple, inexpensive and durable as well as one which is capable of effective operation and use and lends itself to quick installation in connection with cars already in use.

I claim—

1. A course indicator comprising a pointer pivoted to swing in a vertical plane, connecting rods extending from the pointer and having pivotal connection at one end thereof, a lever having side arms pivotally connected to the opposite ends of the said connecting rods and provided with a central portion, a support on which the last-mentioned lever is pivoted to swing in a horizontal plane, the controlling lever pivoted to the central portion of the last-mentioned lever to swing in a vertical plane and a plate having a slotted opening in which the said controlling lever is movable and provided with recesses at spaced points into which the controlling lever is vertically shiftable.

2. A course indicator comprising a pointer mounted to swing in a horizontal plane, connecting rods having pivotal connections with opposite sides of the said pointer, a horizontally swinging lever from opposite sides of which the said connecting rods extend, a controlling lever, a plate having a horizontal slot in which the said controlling lever is mounted to swing and provided with vertically disposed recesses adjacent the lower portion of said slot, the said controlling lever being pivotally connected to the first-mentioned lever to swing vertically with respect thereto into and out of the said recesses.

3. A course indicator comprising a pointer, connecting rods pivoted at one end to opposite sides of the said pointer, a lever pivoted to swing with the pointer and to opposite sides of which said connecting rods are pivoted at their opposite ends, a controlling lever pivoted to said last-mentioned lever to swing at right angles thereto and means in connection with said controlling lever, into which the latter is vertically movable on its pivot with respect to the first-named lever, for securing the said controlling lever in adjusted position.

ROBERT WHEELER.

Witnesses:
J. S. REEVES,
JOHN R. ELSON.

Copies of this patent may be obtained for five cents each, by addressing the "Commissioner of Patents, Washington, D. C."